Feb. 21, 1956

W. H. SHORTELL 2,735,228

GLASS CUTTING TOOL

Filed Dec. 21, 1954

*INVENTOR.*
WILLIAM H. SHORTELL
BY
Chapin + Neal
Attorneys

United States Patent Office 2,735,228
Patented Feb. 21, 1956

2,735,228

GLASS CUTTING TOOL

William H. Shortell, Greenfield, Mass., assignor to Millers Falls Company, Greenfield, Mass., a corporation of Massachusetts Application December 21, 1954, Serial No. 476,659

4 Claims. (Cl. 49—52)

This invention relates to glass cutting tools of the type adapted to score a sheet of glass along a predetermined line and has particular reference to a carbide wheel and bearing pin assembly for the same.

An object of the invention is to provide a relatively inexpensive and durable bearing pin capable of supporting a carbide cutting wheel throughout the useful life of the wheel and tool and without necessitating the expensive finishing operations usually required in connection with the formation of a wheel of this type.

Another object of the invention is to provide a carbide cutting wheel and bearing support therefor which will form a smooth bearing surface during a "break-in" period of initial use of the tool.

The above and other specific objects and advantages of the invention will be apparent from the following disclosure in connection with the accompanying drawings in which.

Figure 1:
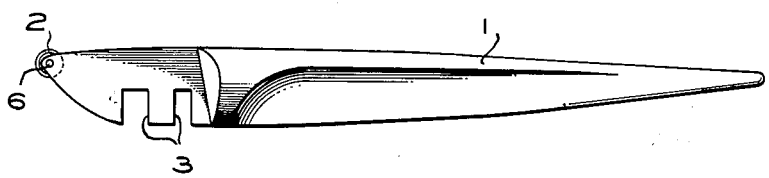
Fig. 1 is an elevational view of a standard glass cutting tool embodying the invention.

The tool illustrated by Fig. 1 is a standard type of glass cutter adapted to score a sheet of glass along a predetermined line, the handle 1 being held to draw the wheel as at 2 over the glass surface guided as by a straight edge and with the sharp edge of the wheel extending peripherally beyond the cutting head to roll on the glass. The handle may be provided with conventional breaker slots shown at 3. Glass cutting tools are well known and this particular form shown need not be further described. It represents the type of structure in which the present invention may be embodied.

Figure 3:
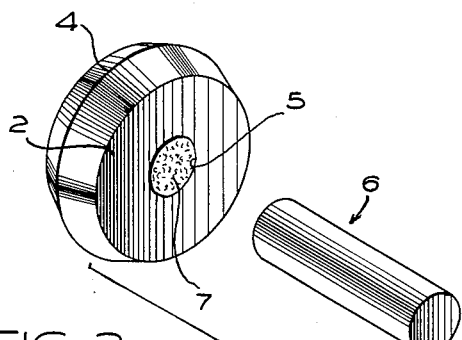
Fig. 3 is a greatly enlarged view in perspective of a carbide cutting wheel and mounting pin to illustrate detail of the wheel.

The cutting wheel 2 as shown in the enlarged view of Fig. 3 is a thin circular disk the periphery of which is formed with a sharpened edge as at 4. A bore or hole at 5 is provided to journal the wheel on a bearing pin 6, the latter being fixed between the forked ends at the head of the tool. The pin 6 receives the pressure of the wheel during use.

In less expensive tools of this type the wheel and pin may be of hard steel composition but the useful life thereof is limited because of rapid wear. Carbide wheels because of superior wearing qualities have been used in quality glass cutters yet the costs of manufacturing this higher grade of tool has necessitated an extremely high price to the user.

Carbide cutting wheels are initially somewhat more expensive because of material costs yet the useful life of the carbide material with respect to its cutting ability is such as to justify the difference in the material cost alone in comparison with hard steel compositions. However, it has been known and accepted in the trade that finishing operations necessary to make a suitable tool which has a carbide wheel and which will endure without breakage for the life of the carbide wheel, have heretofore drastically limited the market for this type of quality tool.

The major difficulty in the manufacture of carbide glass cutting tools has been the finishing operations necessary to provide smooth bearing surfaces in the pin mounting bore of the wheel as at 5 in Fig. 3. A carbide wheel is so hard that unless the bore is lapped out or polished very smoothly it will quickly wear out a hardened steel pin and the useful life of the tool is thus considerably lessened. A carbide pin has also been used and in this case the smoothing operation need not be as precise. Either of these operations, however, are costly and it is to eliminate the finishing operations and overcome such difficulties that the present invention has been conceived and developed.

Figure 2:
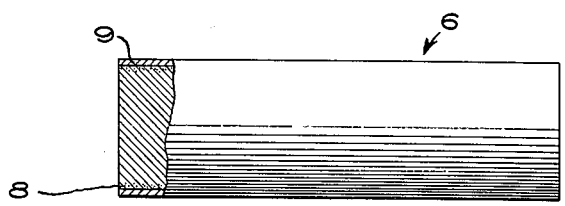
Fig. 2 is a greatly enlarged view of the bearing pin partially in section to show the details thereof.

It will be noted from Fig. 3 that the bore 5 of the wheel which is preferably of tungsten carbide material is characterized by surface irregularities as indicated by the stippling 7. The stippling is intended to illustrate such surface irregularities as exist in a rough hole in making the bore and on which no finishing operations have been performed. The hole may be formed by the usual methods as by compressing the carbide powder around a central plunger when the wheel blank is formed. In the bore the mounting pin 6 constructed as indicated by Fig. 2 is received.

The pin is formed of drill rod steel stock having a hard composition as, for example, carbon .40%, chromium 5%, molybdenum 1.25%, vanadium .35%. As indicated at 8 the pin is case hardened by nitriding. This case hardening is preferably quite thin, and in actual practice is on the order of .001 inch. After the nitriding treatment which imparts a super hard surface to a tough core, the surface of the pin is plated with a soft metal as by an electrodeposition of copper as indicated at 9.

In an actual embodiment of the pin and wheel assembly the diameter of the pin is .051 inch with the rough hole in the wheel being .053 inch. Thus the pin fits in the rough hole with a close running fit. When the tool is used during what may be termed a "break-in" period substantially all of the soft metal of the copper plated skin is transferred to and deposited on the rough bearing surfaces of the bore, filling up and glazing over the extremely hard irregularities to produce a durable smooth bearing surface running on the hard nitrided pin surface. It has been found that pin wear is thus infinitesimal and enables the pin to outlast the life of the cutting edge of a carbide wheel.

Having described my invention, I claim:

1. In a glass cutter tool of the standard type adapted to score a sheet of glass along a predetermined line, a case hardened hard steel bearing pin fixed in the cutting head of the tool with said pin having an outer coating of soft metal and a thin circular carbide cutting wheel mounted on said pin with the bore of said wheel formed as an unfinished rough hole.

2. In a glass cutter tool of the standard type adapted to score a sheet of glass along a predetermined line, a nitrided hard steel bearing pin fixed in the cutting head of the tool with the bearing surface of said pin provided with a copper plated coating skin and a thin circular carbide cutting wheel mounted on said pin with a close running fit and the bore of said wheel having bearing surfaces characterized by the surface irregularities of an unfinished rough hole.

3. A carbide glass cutting wheel and mounting pin assembly for a standard glass cutter tool having a rotatably mounted wheel with a sharp edge extending peripherally beyond the cutting head thereof and adapted to score a sheet of glass along a predetermined line; said assembly comprising a thin circular carbide wheel having an axially disposed central pin mounting bore characterized by an unfinished rough bearing surface having unsmoothed surface irregularities, and a wheel mounting pin fixed in the head of the cutter carrying said carbide wheel with said pin formed of case hardened extremely hard steel rod stock which has been formed with a surface coating of soft metal, the rotation under pressure of said wheel in use being capable of transferring the soft metal of the pin surface to the inside bearing surfaces of said wheel bore during an initial period of use whereby the irregularities thereof are filled up and glazed over to produce a smooth bearing surface for running on the hardened pin surface.

4. A bearing pin and carbide cutting wheel assembly for a glass cutter tool of the standard type adapted to score a sheet of glass along a predetermined line in which said carbide cutting wheel is formed with an axial bore the bearing surfaces of which are characterized by surface irregularities of an unfinished rough hole and said bearing pin is composed of hard steel drill rod stock having a surface case-hardened by nitriding and formed with a plated outer coating of soft copper, said bearing pin upon the application of pressure on the carbide wheel in initial use of the wheel being adapted to transfer the soft copper to the wheel bearing surfaces by filling the irregularities thereof and producing a smooth bearing for running on said nitrided pin surface.

References Cited in the file of this patent

UNITED STATES PATENTS

| | | |
|---|---|---|
| 1,904,568 | Taylor | Apr. 18, 1933 |
| 2,289,718 | Moore | July 14, 1942 |